United States Patent [19]

Dow et al.

[11] Patent Number: 5,166,812
[45] Date of Patent: Nov. 24, 1992

[54] FAX MACHINE WITH RETRACTABLE DRAWER

[75] Inventors: James C. Dow; Modest Khovaylo, both of Fort Collins, Colo.

[73] Assignee: Hewlett-Packard Company, Palo Alto, Calif.

[21] Appl. No.: 729,086

[22] Filed: Jul. 12, 1991

Related U.S. Application Data

[63] Continuation-in-part of Ser. No. 653,449, Feb. 5, 1991.

[51] Int. Cl.⁵ ............................................... H04N 1/00
[52] U.S. Cl. ..................................... 358/498; 358/473; 358/400; 361/291; 271/288
[58] Field of Search ............... 358/498, 473, 400, 474; 355/308, 309, 311, 313, 314, 321; 346/145; 271/288, 298, 128, 256, 257, 176; 361/380, 391, 415; 248/658; 312/21, 183, 188, 237, 317.1

[56] References Cited

U.S. PATENT DOCUMENTS

| | | | |
|---|---|---|---|
| 4,139,855 | 2/1979 | Marquardt | 346/145 |
| 4,652,937 | 3/1987 | Shimura et al. | 358/473 |
| 4,735,467 | 4/1988 | Wolters | 312/21 |
| 4,912,563 | 3/1990 | Narita | 358/401 |
| 4,970,544 | 11/1990 | Furusawa et al. | 355/311 |

FOREIGN PATENT DOCUMENTS

| | | | |
|---|---|---|---|
| 0013471 | 1/1984 | Japan | 358/400 |
| 0073696 | 3/1990 | Japan | 361/415 |

*Primary Examiner*—Edward L. Coles, Sr.
*Assistant Examiner*—Jill Jackson

[57] ABSTRACT

A modular fax machine including a document feeder for feeding documents to a scanner, a control panel for operator input of selectable fax machine parameters, a drawer for supporting the document feeder and the control panel, and a housing for extensibly and retractably supporting the drawer.

16 Claims, 6 Drawing Sheets

FAX MACHINE WITH RETRACTABLE DRAWER

This application is a continuation-in-part of U.S. patent application Ser. No. 653,449 filed Feb. 5, 1991, for RETRACTABLE DRAWER-TYPE FACSIMILE MACHINE MODULE, which is hereby incorporated by reference for all that it discloses.

BACKGROUND OF THE INVENTION

The present invention relates generally to fax machines and, more particularly, to a modular fax machine adapted to support a printer on an upper surface thereof and having certain components thereof mounted within a retractable drawer.

Fax machines have come into widespread use in the past several years as a convenient means for transmitting written information. Conventional fax machines operate to transmit and receive images of a document. A fax machine transmits a document by producing a graphic image of the document which is converted into a data signal. The data signal is transmitted over conventional phone lines to a receiving fax machine which uses the data signal to drive a printer portion of the receiving fax machine to print an image of the document.

Most conventional fax machines are operable in a fax mode and also a copy mode. In the copy mode, a copy of the document which is fed into the imaging portion of the fax machine is printed by the printer portion of the same fax machine.

The resolution of the printout of a conventional fax machine is usually low. Fax machines also typically use a special paper which is installed in rolls and which tends to curl. For these reasons, most businesses do not use their fax machines for copywork and, in fact, often make a photocopy of any fax document which is received to avoid difficulties which arise when working with fax documents.

Recently, modular fax machines have been introduced which take advantage of the higher resolution and plain sheet paper printing capabilities of laser printers, or the like. Such modular fax machines do not have integral printers. Rather, modular fax machines are provided with processing circuitry and software which enable them to generate a data signal which may be used directly by an attached laser printer. Typically, such modular fax machines are adapted to also be connected to a personal computer which is also attached to the laser printer. In such an assembly, the fax machine functions as a fax modem for the personal computer and as an imaging device or "scanner" for both the personal computer and the laser printer. Such modular fax machine/PC/printer assemblies are described in U.S. patent application Ser. Nos. 590,878 filed Sept. 28, 1990, for DEVICE SHARING SYSTEM USING PCL MACROS of Richard L. Kochis et al.; 606,244 filed Oct. 31, 1990, now abandoned for REMOTE PRINTING USING FAX of Richard L. Kochis et al.; 589,949 filed Sept. 28, 1990, for SWITCH FOR SHARING A PERIPHERAL DEVICE of Brian L. Hastings; 596,252 filed Oct. 12, 1990, for PCL VERTICAL GRAPHICS SCALING USING MACROS of Richard L. Kochis et al.; 606,250 filed Oct. 31, 1990, for ASCII TO ASCII TRANSFER USING FAX PROTOCOL of Richard L. Kochis et al.; and 07/730,016 filed on the same date as this application, for FAX MACHINE CONTROL PANEL of Michael David Erickson and James Charles Dow, which are each hereby specifically incorporated by reference for all that is disclosed therein.

The recent introduction of modular fax machines follows a trend begun by the introduction of the "personal computer" and followed by the introduction of the "personal printer" towards providing an individual operator with all of the computing power and peripheral devices which he is likely to need right at his desk. However, a problem associated with this trend is that an individual operator often has only limited desk space and thus has difficulty fitting a personal computer and multiple peripherals within his work area. In response to this problem, computer and computer peripheral manufacturers have in recent years significantly reduced the size of their machines, thus reducing the "footprints" of the machines. As used herein, the "footprint" of a machine refers to a two-dimensional figure created on a base surface supporting the machine through a vertical projection of the outermost periphery of the machine onto the base surface. However, even with reduced footprints, a computer with its screen and keyboard, a fax machine module, and a printer may still occupy a sizable amount of desk space.

The present invention is adapted to increase available desk space by enabling modular fax machines and associated laser printers or other printing devices to be mounted in a stacked arrangement. A problem associated with stacking of printers or other devices on a fax machine is that traditional fax machines have control panels and document feeders positioned on the top portion thereof. Thus, stacking a printer on top of a fax machine would interfere with the operation of a fax machine of traditional construction. One possible solution would be to provide a control panel and document feeder on a front surface of the fax machine. However, such an arrangement would necessitate a relatively tall fax machine housing to provide adequate room for the control panel and would probably also require an outwardly-projecting document feeder assembly which would increase the overall footprint of the machine. As used herein, "footprint" refers to a surface configuration provided on a base surface through vertical projection of the outermost periphery of a device onto the base surface.

SUMMARY OF THE INVENTION

The invention may comprise a modular fax machine having a document feeder and a control panel mounted in a drawer. The drawer is mounted within a fax housing and may be extended to access the document feeder and control panel. When the drawer is closed, the document feeder and control panel are positioned entirely within the fax housing, thus considerably reducing the "footprint" of the fax machine. The fax machine may be a fax module adapted to be connected to a separate printer. The fax module may have a relatively small vertical dimension and may have a flat upper surface adapted to support the attached printer. In one preferred embodiment, the footprint of the attached printer is approximately the same as that of the fax module, and thus the fax module and printer, in a stacked arrangement with the fax door closed, have a combined footprint of about the same size as either device standing alone.

The fax module is easily operated even with a printer positioned on top of it due to the fact that the control panel and document feeder of the fax module are accessed by opening the fax drawer. A conventional fax machine design with the control panel and feeder document provided at the top of the fax machine would not permit stacking. Thus, a very compact, desk-space-saving arrangement of fax module and printer may be provided.

BRIEF DESCRIPTION OF THE DRAWINGS

An illustrative and presently preferred embodiment of the invention is shown in the accompanying drawings in which.

DETAILED DESCRIPTION OF THE INVENTION

FIGS. 1–8 illustrate a modular fax machine 10 having a generally parallelepiped-shaped housing 12 having a generally horizontally extending top wall 14 which may have a length of 15.75 inches and a width of 13.00 inches. The housing may have a generally horizontally extending bottom wall 16 having a length of 15.00 inches and a width of 12.25 inches. The top wall and bottom wall are connected by a first (left) lateral sidewall 18 and a second (right) lateral sidewall 20, a back sidewall 22, and a front sidewall 24. Each of the sidewalls may have an overall height, as measured between the top and bottom walls, of 2.75 inches. The housing includes an interior cavity 26, FIG. 9, which is adapted to receive a fax drawer 60 therein.

Figure 1:
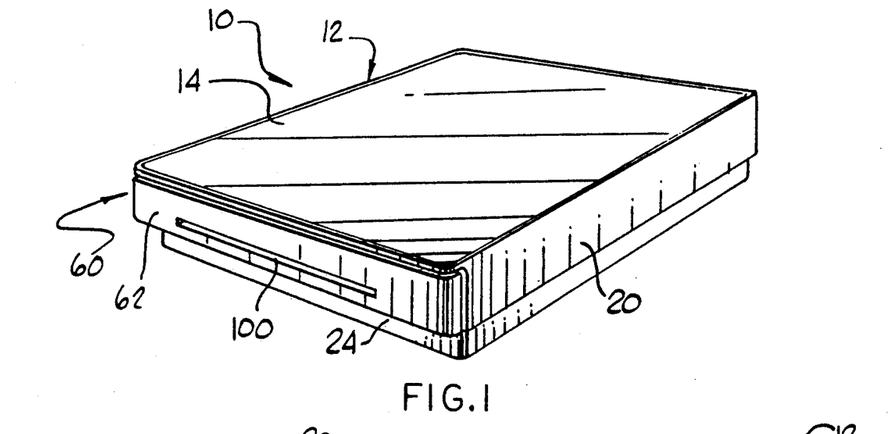
FIG. 1 is a perspective view of a fax machine module having a retractable drawer with the drawer in a closed position.
Figure 2:
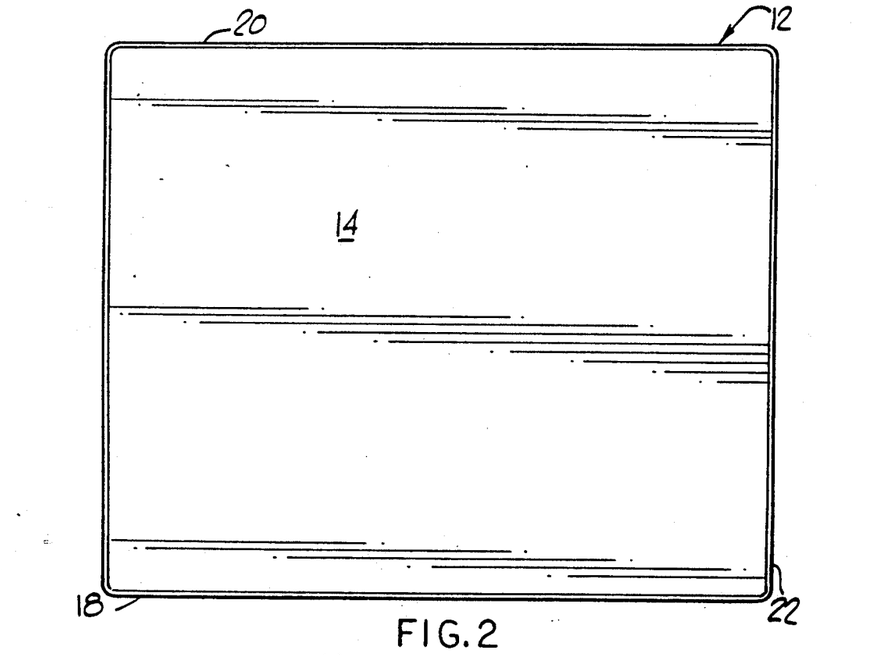
FIG. 2 is a top plan view of the fax machine module of FIG. 1.
Figure 3:
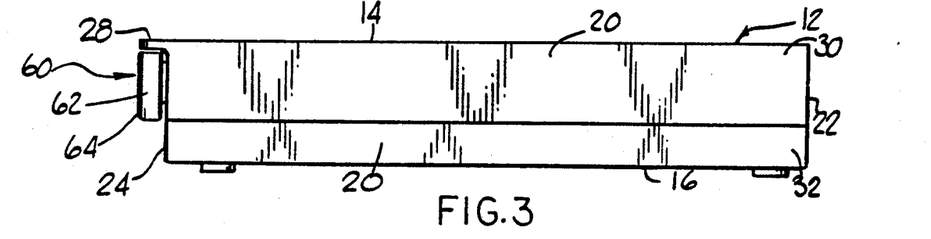
FIG. 3 is a right side elevation view of the fax machine module of FIG. 1, the left side elevation view being a mirror image.
Figure 4:
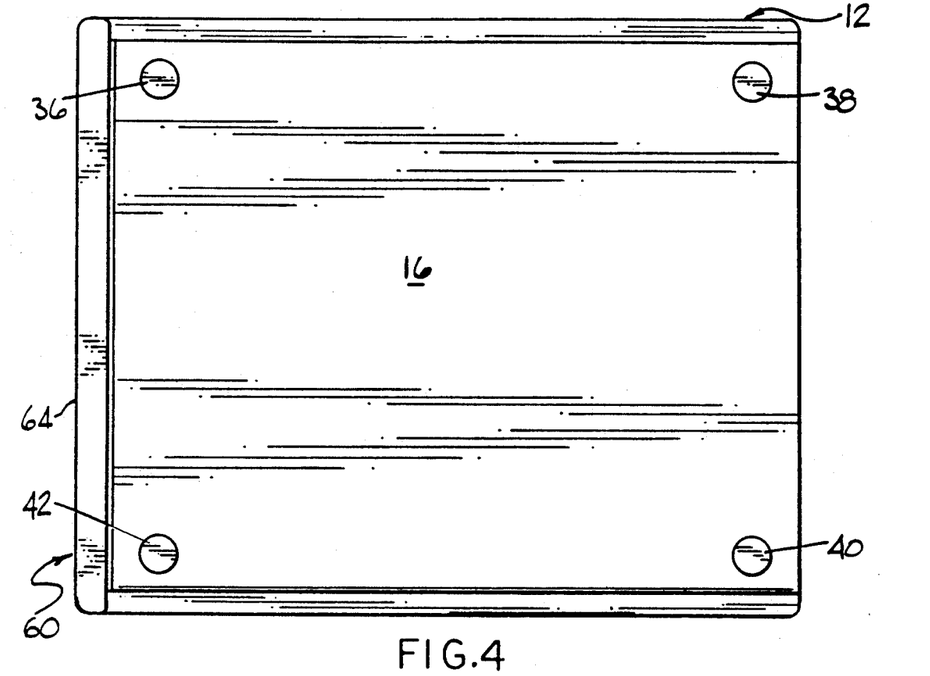
FIG. 4 is a bottom plan view of the fax machine module of FIG. 1.

The top wall 14 may comprise a forwardly extending lip 28 which is adapted to extend over the top of the forward end of the fax drawer 60 when the fax drawer is in a fully closed position, as shown in FIG. 3.

Figure 6:
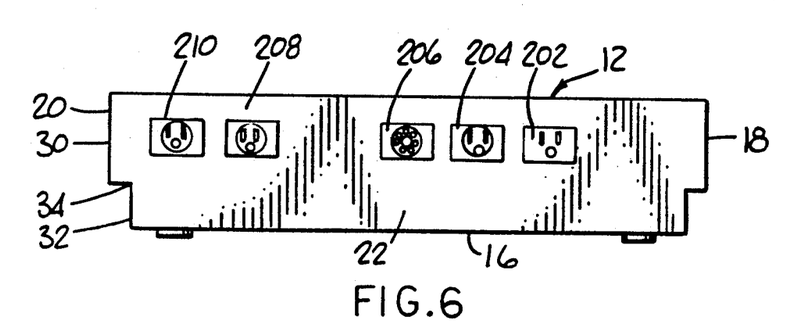
FIG. 6 is a rear elevation view of the fax machine module of FIG. 1.
Figure 7:
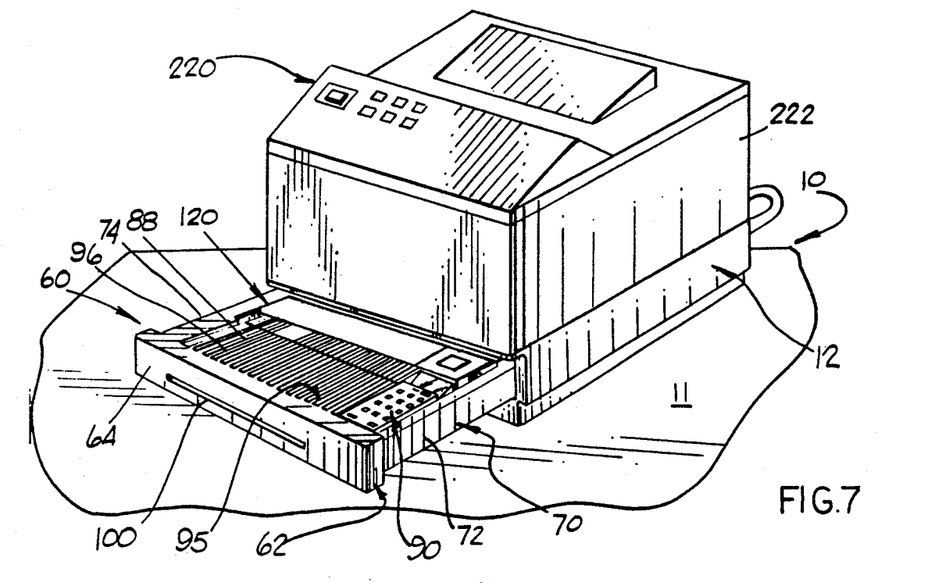
FIG. 7 is a perspective view of the fax machine module of FIG. 1 with the drawer thereof in an open position and with an operably connected laser printer mounted on a top portion thereof.
Figure 8:
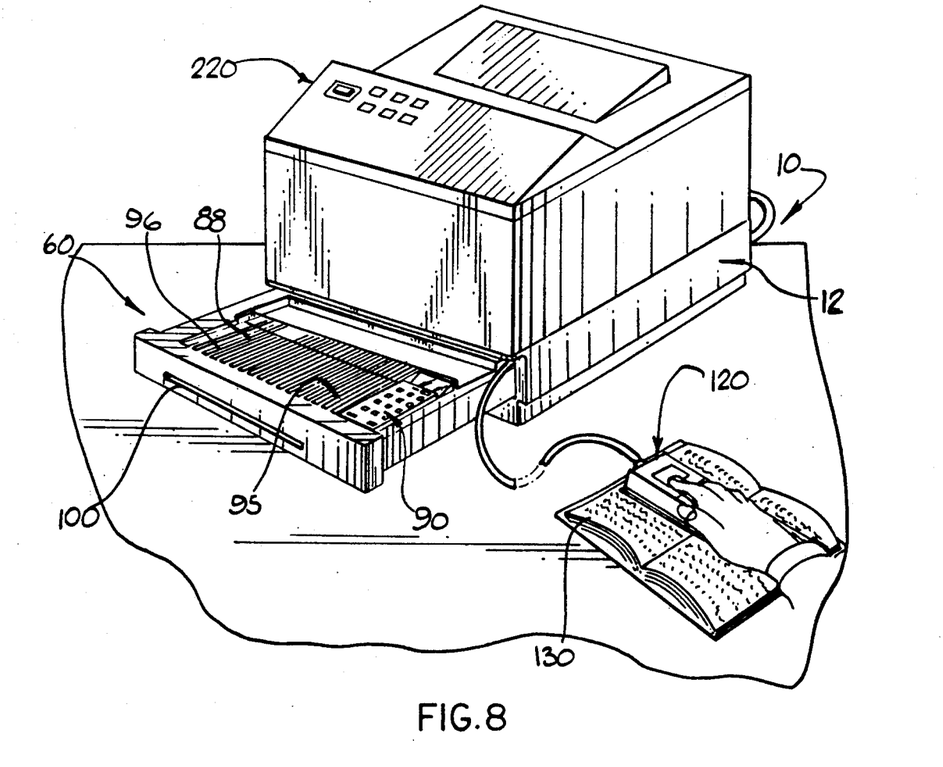
FIG. 8 is a perspective view of the fax machine module and laser printer of FIG. 7 with a removable scanner portion of the fax machine module being used to scan pages of a pamphlet.

Each of the lateral sidewalls 18, 20 comprise a vertical upper wall portion 30 and a vertical lower wall portion 32 which is inwardly spaced from the upper wall portion and connected thereto by a horizontal connector portion 34, FIG. 6. The upper wall portion 30 may be 1.8 inches in height, the lower wall portion 32 may be 0.95 inches in height, and the horizontal connector portion 34 may extend a distance of 0.4 inches between the two vertical portions.

Figure 5:
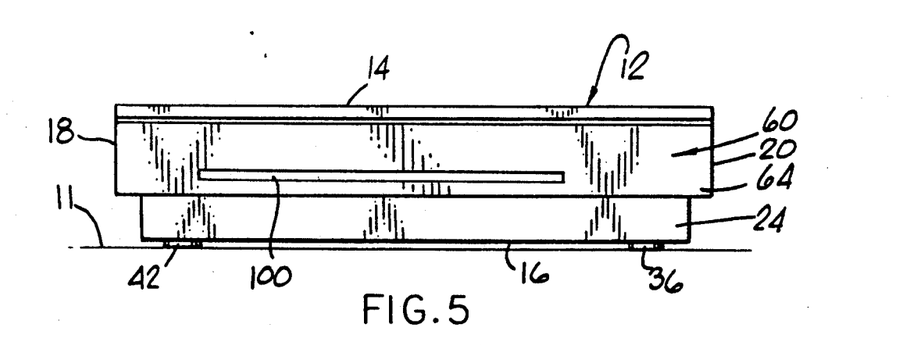
FIG. 5 is a front elevation view of the fax machine module of FIG. 1.

The bottom wall portion may comprise felt footpads 36, 38, 40, 42 or the like to cushion and stabilize the housing on an associated support surface 11, such as a desktop, FIG. 5.

Figure 9:
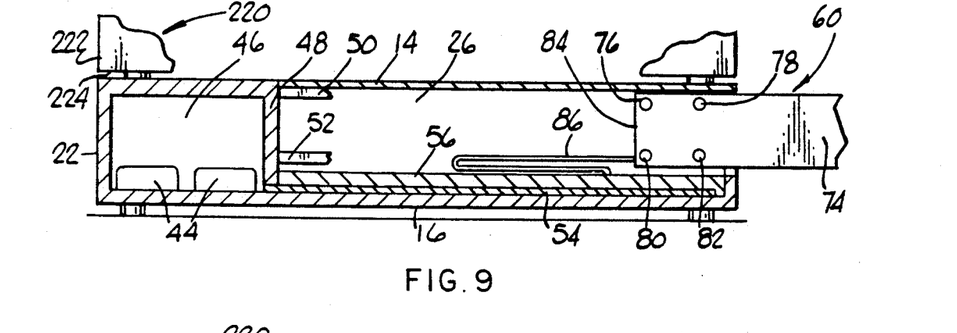
FIG. 9 is a cross sectional, side elevation view of the fax machine module of FIG. 1 with the drawer in an open position.
Figure 10:
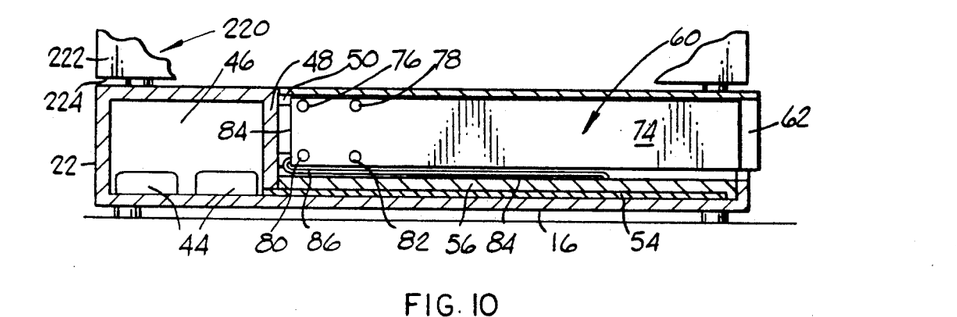
FIG. 10 is a cross sectional, side elevation view of the fax machine module of FIG. 1 with the drawer in a closed position.

As illustrated in FIGS. 9 and 10, a conventional fax power supply unit 44 may be provided in a rear chamber 46 defined by top, bottom, back, and lateral sidewall portions of the housing 12 and by vertical interior wall panel 48. As further illustrated by FIG. 9, four roller guide rails 50, 52 (only two shown) may be mounted on interior surfaces of each of the lateral sidewalls 18, 20 to guide the motion of the drawer 60. A controller/modem/fax board 54, FIG. 10, is horizontally disposed between the fax bottom wall 16 and a horizontal interior wall panel 56 which defines a lower portion of cavity 26.

As best illustrated in FIGS. 1, 3 and 7–10, fax drawer 60 has a generally parallelepiped-shaped configuration including a vertically and laterally extending front panel 62 having a vertical forward face 64 which is adapted to fit flush with the forward edge of lip 28 when the fax drawer is in a closed position. The front panel 62 is attached to a forward end of a drawer body portion 70 which comprises vertically extending lateral sidewalls 72, 74 upon which drawer rollers 76, 78, 80, 82 (only four shown) are rotatably mounted. A drawer vertically extending rear wall 84 extends between the sidewalls and has one end of a cable 86 extending therethrough. The cable is connected at the one end to various fax operating components in the drawer 60 and is connected at the other end to board 54.

A drawer bed portion 88 extending between the front panel rear wall and sidewall portions has a generally flat, generally horizontally disposed control panel 90 positioned to one lateral side thereof. A document feeder assembly 95 is positioned adjacent the control panel and includes a document feeder tray 96 which defines an entry portion of a paper path 98 extending through the drawer and exits at 100 as illustrated partially by dashed lines in FIG. 12. The paper path loops back through a lower portion of the drawer and has a plurality of rollers 102, 104, 106, 108, 110, 112 positioned therealong which are operably driven by a belt assembly 113 attached to a roller motor 114. Motor 114 is connected to board 54 by cable 86. In a preferred embodiment, both the control panel 90 and feeder tray 96 are inclined at an angle of less than 30°, and most preferably less than 15°, from a plane parallel to top wall 14.

Figure 11:
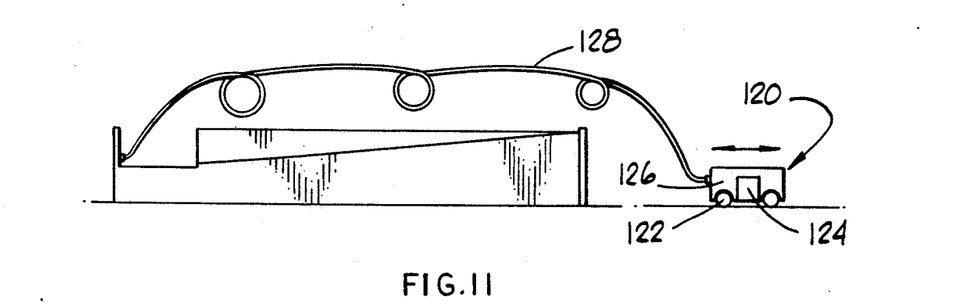
FIG. 11 is a schematic, cross sectional, side elevation view of the drawer portion of the fax machine module of FIG. 1 with a removable scanner portion removed therefrom.
Figure 12:
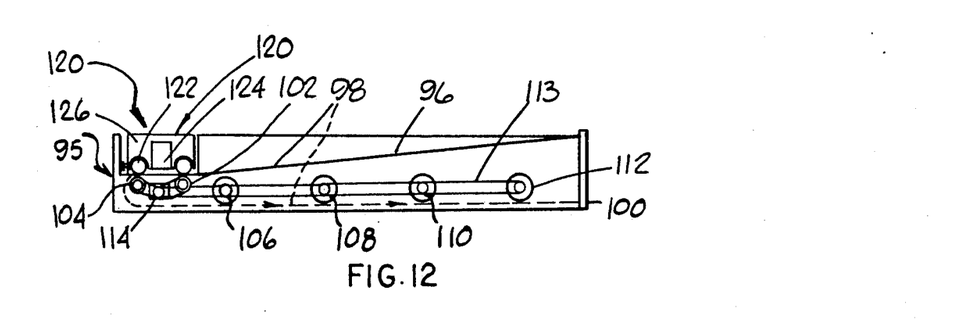
FIG. 12 is a more detailed, schematic, cross sectional, side elevation view of the drawer portion of the fax machine module of FIG. 1 with a removable scanner portion in place in the drawer.

In the preferred embodiment illustrated in FIGS. 11 and 12, which is presently the best mode contemplated, a scanner assembly 120 is provided adjacent to an upper portion of the paper path 98. The scanner assembly 120 is a removable scanner assembly having a plurality of idler rollers 122 mounted at a bottom portion thereof. The scanner assembly may be held in position within the drawer by a suitable latch (not shown) and may be removed from the drawer to enable scanning of bulky documents such as pamphlets 130 or the like. The scanner assembly comprises an imaging module 124 having an LED-type light source, a rod lens-type imaging lens, and a CCD-type image plane, as are well-known in the art. The imaging module 124 is positioned within a U-shaped support member 126 which is attached by cord 128 and cable 86 to board 54.

When the removable scanner assembly 120 is positioned within the drawer as shown in FIG. 12, paper is loaded into the paper tray 96 face-up and is discharged from the forward exit slot 100 face-down.

Figure 13:
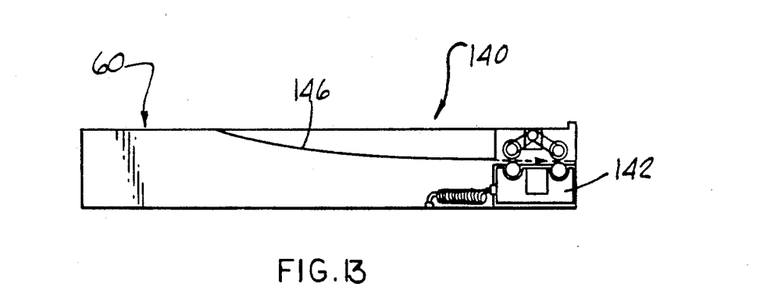
FIG. 13 is a schematic, cross sectional, side elevation view of an alternative embodiment of a fax drawer configuration having a removable scanner with the removable scanner in place in the drawer.
Figure 14:
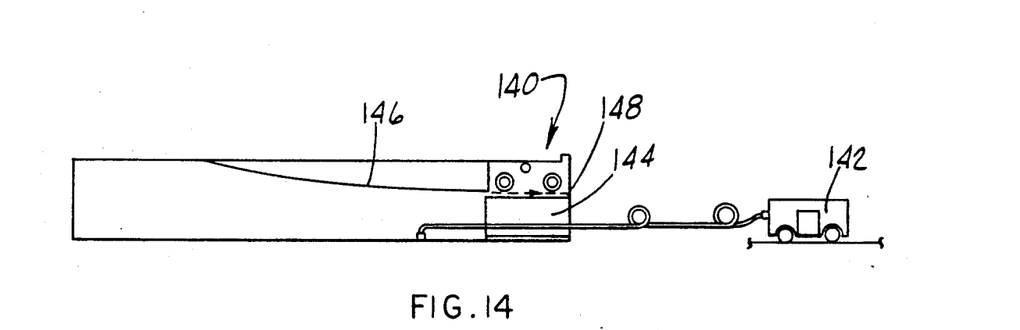
FIG. 14 is a schematic, cross sectional, side elevation view of the alternative embodiment of FIG. 13 with the removable scanner removed.

An alternative document feeder assembly 140 is illustrated in FIGS. 13 and 14 in which a removable scanner assembly 142 of the same general construction as that described above with reference to FIGS. 11 and 12 is provided within a lower cavity 144 at a forward end of the fax drawer 60. In this arrangement, a document tray 146 is provided which slopes downwardly from a mid-portion of the drawer towards the forward end of the drawer, with a document discharge exit 148 again provided at the front panel of the drawer.

Various other drawer configurations having a fixed scanner assembly including a lamp 160, rod-type imaging lens 162, and CCD-type image plane 164 are illustrated in FIGS. 15–19. In each of these configurations, a document feeder tray 166 provides an entry portion for a paper path 168 which terminates at a paper exit 170. A document fed into the feeder tray is urged along the paper path by rollers (not shown) driven by an associated drive motor (not shown).

Figure 15:
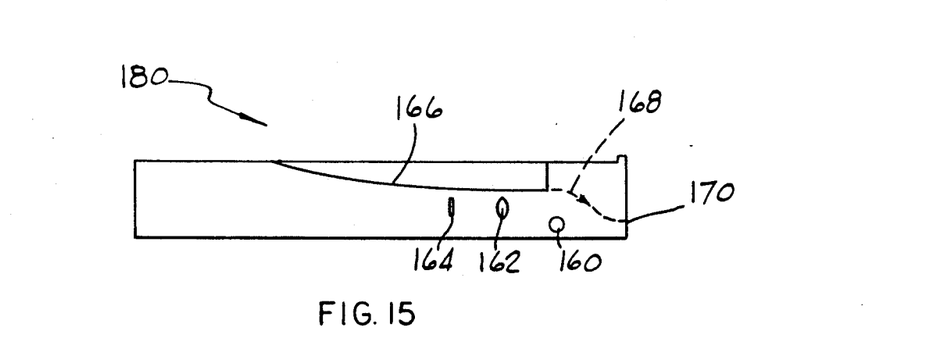
FIGS. 15–19 are schematic, cross sectional, side elevation views of five alternate fax machine drawer designs.

In the assembly 180 of FIG. 15, the paper is inserted face-down and is output face-down.

Figure 16:
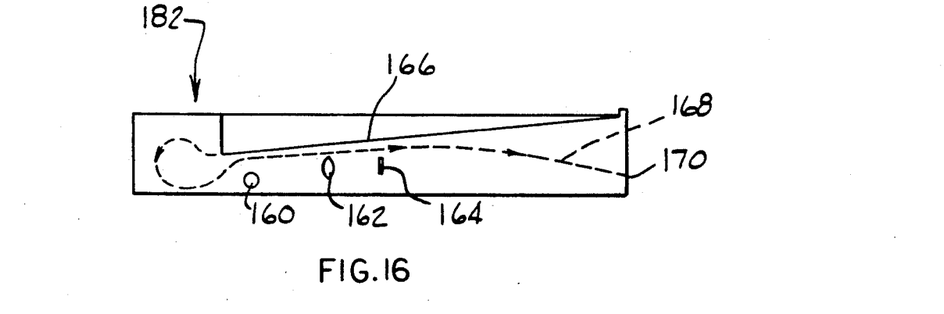

In the assembly 182 of FIG. 16, the paper is inserted face-up and is output face-down.

Figure 17:
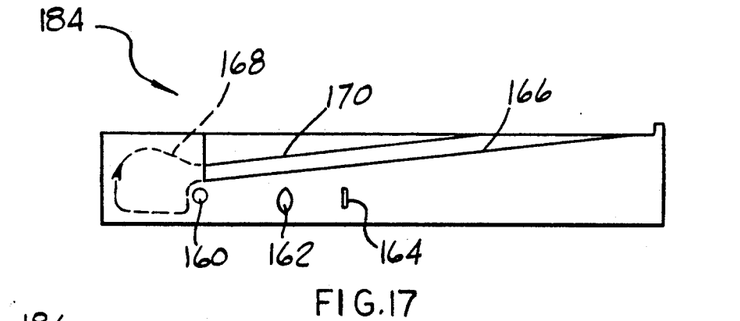
Figure 18:
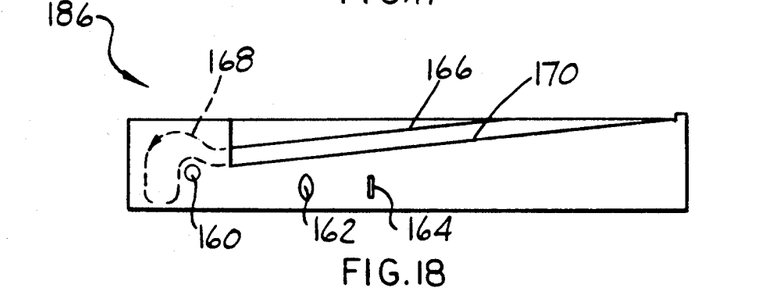

In the assembly 184 of FIG. 17, the document exit 170 comprises an output tray positioned parallel to the input tray 166. Paper is input face-down and is output face-up.

In the assembly 186 of FIG. 18, the exit 170 is again an output tray, in this case provided below the input tray 166. Paper is input face-up and is output face-down.

Figure 19:
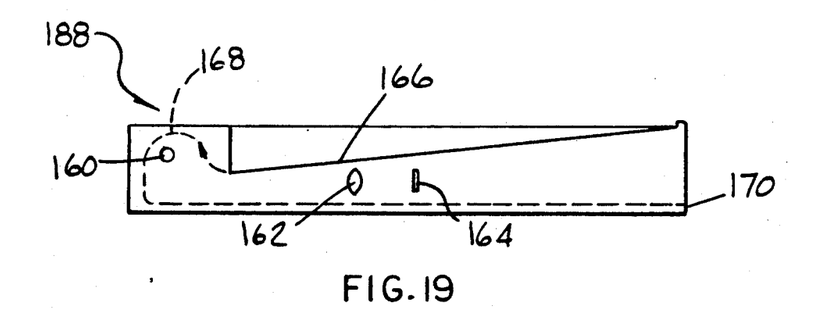

In the assembly 188 of FIG. 19, paper is input face-down and is discharged face-up.

As illustrated in FIG. 6, the fax machine 10 may comprise a plurality of adapters 202, 204, 206, 208, 210, etc. which enable the fax machine to be connected to a conventional wall power outlet (not shown) and also to a telephone line (not shown), a computer (not shown), and a printer 220.

The printer 220, in one preferred embodiment, is a Hewlett-Packard LaserJet IIP printer having a housing 222 with a bottom portion 224 which is adapted to be positioned on the top surface 14 of the fax machine 10, FIG. 9. In a preferred embodiment, the printer 220 has a footprint of approximately the same size and shape as that of the fax machine 10. Thus, the stacked printer 220 and fax machine 10, with the fax drawer 60 closed, has a combined footprint of approximately the same size and shape as either the fax machine 10 or the printer 220 standing alone. Given the fact that the fax machine 10 has a relatively small height, the fax machine and printer assembly illustrated in FIGS. 7 and 8 comprise a relatively small height differential, e.g. 2.75 inches, greater than the height of the printer, e.g. 7.8 inches, standing alone. Thus, a modular fax machine is provided which is adapted to have a printer 220 mounted thereon so as to provide a combined configuration having a footprint of approximately the same size as the printer 220 and having a height only a small amount greater, e.g. 35% greater, than the height of the printer standing alone.

Of course, the fax module has a considerably larger footprint with the drawer 60 in the extended position, e.g 60% greater. However, since the total time in which a fax machine is actually in use in sending or scanning a document is generally relatively brief, the inconvenience associated with having the fax drawer extended is minimal.

While illustrative and presently preferred embodiments of the invention have been described in detail herein, it is to be understood that the inventive concepts may be otherwise variously embodied and employed and that the appended claims are intended to be construed to include such variations except insofar as limited by the prior art.

What is claimed is:

1. A modular fax machine comprising:
   a) document feeder means for feeding documents to the fax machine;
   b) control panel means for operator input of selectable fax machine parameters;
   c) drawer means for supporting said document feeder means and said control panel means; and
   d) housing means for extensibly and retractably supporting said drawer means.

2. The invention of claim 1, said drawer means having:
   a retracted state wherein said document feeder means and said control panel means are inaccessible to a user; and
   an extended state wherein said document feeder means and said control panel means are accessible to a user.

3. The invention of claim 2 wherein said housing means comprises a top surface portion and an interior cavity and wherein said drawer means is positioned within said interior cavity substantially entirely within a vertical projection of said top surface portion of said housing means in said retracted state whereby in said retracted state said housing means and said drawer means comprise a combined footprint substantially as small as the individual footprint of said housing means.

4. The invention of claim 3 further comprising scanner means supported within said drawer means for scanning a document.

5. The invention of claim 4 said scanner means being selectively removably mounted within said drawer means and having an attached state for scanning documents fed thereto by said feeder means and having a detached state for scanning documents unsuitable for feeding through said feeder means.

6. The invention of claim 2 said top surface portion of said housing means comprising a flat surface adapted to support a printer thereon.

7. The invention of claim 2 wherein said document feeder means and said control panel means each comprise a generally flat panel arranged generally parallel to said fax housing means top surface portion.

8. The invention of claim 7 wherein said document feeder means and said control panel means panels are each inclined less than 30° with respect to said fax housing means top surface portion.

9. A modular fax machine and printer assembly comprising:
 a) printer having a printer housing with a bottom surface portion;
 b) a modular fax machine comprising:
  document feeder means for feeding documents to a scanner means;
  control panel means for operator input of selectable fax machine parameters;
  drawer means for supporting said document feeder means and said control panel means therein; and
  fax housing means having a bottom surface portion, a top surface portion and an interior
  cavity for extensibly and retractably supporting said drawer means;
 said printer bottom surface portion being supported on said fax housing means top surface portion.

10. The invention of claim 9, said drawer means having:
 a retracted state wherein said document feeder means and said control panel means are inaccessible to a user; and
 an extended state wherein said document feeder means and said control panel means are accessible to a user; and
 wherein said drawer means is positioned substantially entirely within a vertical projection of said top surface portion of said housing means in said retracted state whereby in said retracted state said fax housing means and said drawer means comprise a combined footprint substantially as small as the individual footprint of said fax housing means.

11. The invention of claim 10 wherein said fax housing means top surface portion is of substantially the same size and shape as said printer housing bottom surface portion and aligned therewith whereby said modular fax machine with said drawer means in said retracted state and said printer supported on said fax machine collectively have a footprint of approximately the same size as the individual footprint of said printer.

12. The invention of claim 9 wherein said document feeder means and said control panel means are generally flat and are each inclined less than 30° with respect to said fax housing means top surface portion.

13. A modular fax machine and printer assembly comprising:
 a modular fax machine supported on a work surface and having a flat generally horizontally extending control panel and a flat generally horizontally extending document feeder tray both mounted within a drawer which is extendably and retractably mounted within a fax machine housing;
 a printer operably electrically connected to said modular fax machine for receiving printing signals therefrom and positioned on top of said modular fax machine;
 said modular fax machine and said printer supported thereby collectively having substantially the same footprint on said work surface as said modular fax machine standing alone.

14. A method of sending a fax and generating a copy of an incoming fax comprising the steps of:
 a) sending a fax using the steps of:
  i) opening a drawer portion of a modular fax machine in which a fax control panel and document feeder are mounted;
  ii) placing a document into the document feeder;
  iii) selecting appropriate fax commands from the control panel;
  iv) closing the drawer;
 b) generating a copy of an incoming fax using the steps of:
  i) sending printing commands from the modular fax to a separate printer supported on a top surface of the modular fax machine;
  ii) printing out a document with the printer in response to the printing commands.

15. A modular fax machine and printer assembly comprising:
I) a modular fax machine comprising:
 a) a generally parallelepiped-shaped fax housing having generally horizontally extending top and bottom walls and generally vertically extending first and second lateral sidewalls, and a generally vertically extending back sidewall which define an interior cavity having a forward opening;
 b) a fax drawer displaceably supported by said fax housing; said fax drawer comprising a generally vertically extending front face portion and a generally horizontally extending bed portion; said bed portion being fully retractable into said housing interior cavity and being forwardly extendable from said interior cavity opening;
 c) a generally flat, generally horizontally disposed control panel mounted in said fax drawer bed portion;
 d) a generally flat, generally horizontally disposed document feeder tray mounted in said fax drawer bed portion;
 e) a document scanner mounted in said fax drawer bed portion;
 f) said fax drawer having an open state wherein said control panel and said document feeder tray are accessible from outside said fax housing and a closed state wherein said control panel and said document feeder tray are inaccessible from outside said fax housing;
 g) a controller, fax, and modem board fixedly associated with said fax housing;
 h) a power supply module fixedly mounted within said fax housing and electrically connected to said board;
 i) a flexible sheath mechanically attached at one end to said housing and at an opposite end to said drawer and supporting electrical cable extending between said board and said control panel, said document feeder and said document scanner;
II) a printer having a footprint no larger than the footprint of the fax housing;
 a) said printer being operably electrically connected to said fax machine for receiving printing commands therefrom;
 b) said printer being positioned on top said fax housing top wall in alignment therewith whereby the combined footprint of said fax machine and said printer mounted thereon is approximately the same size as the individual footprint of said fax machine standing alone.

16. The invention of claim 15 wherein the height of said modular fax machine is less than 25% of the smaller of its length and width.

* * * * *